(12) United States Patent
Corry et al.

(10) Patent No.: US 7,934,208 B2
(45) Date of Patent: Apr. 26, 2011

(54) METHOD FOR TRANSPARENT ON-LINE DYNAMIC BINARY OPTIMIZATION

(75) Inventors: Kevin Michael Corry, Pflugerville, TX (US); Mark Alan Peloquin, Austin, TX (US); Steven Pratt, Leander, TX (US); Santhosh Rao, Austin, TX (US); Karl Milton Rister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 11/549,319

(22) Filed: Oct. 13, 2006

(65) Prior Publication Data
US 2008/0092128 A1   Apr. 17, 2008

(51) Int. Cl.
*G06F 9/45*  (2006.01)
(52) U.S. Cl. .................. 717/153; 717/158; 717/159
(58) Field of Classification Search .......... 717/124–135, 717/151–161; 711/202–209
See application file for complete search history.

(56) References Cited

U.S. PATENT DOCUMENTS

| | | | |
|---|---|---|---|
| 6,202,205 B1 * | 3/2001 | Saboff et al. .................. | 717/151 |
| 6,463,582 B1 * | 10/2002 | Lethin et al. .................. | 717/158 |
| 6,901,587 B2 * | 5/2005 | Kramskoy et al. ............ | 717/154 |
| 7,124,404 B1 * | 10/2006 | Bebout et al. ................. | 717/127 |
| 7,464,373 B1 * | 12/2008 | Yunt et al. ..................... | 717/125 |
| 2003/0041316 A1 * | 2/2003 | Hibbeler et al. .............. | 717/130 |
| 2006/0265693 A1 * | 11/2006 | Goldin .......................... | 717/124 |

OTHER PUBLICATIONS

Xianglong Huang, et al. "Dynamic Code Management: Improving Whole Program Code Locality in Managed runtimes", Jun. 2006, ACM/Usenix International Conference on Virtual Execution Environment, Proceedings of the 2nd International Conference, p. 133-143.*
http://web.archive.org/web/20050912083517/en.wikipedia.org/wiki/Dynamic_compilation.*

* cited by examiner

*Primary Examiner* — Wei Y Zhen
*Assistant Examiner* — Chung Cheng
(74) *Attorney, Agent, or Firm* — Yee & Associates, P.C.; Steven L. Bennett

(57) ABSTRACT

A generalized on-line solution for achieving transparent binary optimization using pre-existing profiling facilities and virtual memory remapping of text regions. An optimization environment is initialized which comprises a debugger program, a profiling facility, and an optimizer. A running target program is attached to the debugger program, wherein the debugger program monitors process execution of the target program. Responsive to monitoring the running target program, profile data of the running target program is collected using the profiling facility. The profile data is provided to the optimizer, wherein the optimizer analyzes the profile data and existing code of the running target program. Responsive to a determination to optimize the existing code based on the profile data, optimized code is generated for the running target program. The optimized code is provided to the debugger program, wherein the debugger program inserts the optimized code into a virtual address space of the running target program.

24 Claims, 8 Drawing Sheets

METHOD FOR TRANSPARENT ON-LINE DYNAMIC BINARY OPTIMIZATION

BACKGROUND OF THE INVENTION

1. Field of the Invention

The present invention relates generally to an improved data processing system, and in particular, to a computer implemented method, data processing system, and computer program product for providing a generalized on-line solution to achieve transparent binary optimization using pre-existing profiling facilities and virtual memory remapping of text regions.

2. Description of the Related Art

Binary optimization refers to the optimization of a native program binary to improve the performance of a program. This optimization may be performed statically (i.e., off-line) or dynamically (i.e., while the program executes, or on-line). Existing off-line binary optimization techniques commonly used today are limited to a static process of compilation or code re-ordering which use profiles generated from instrumented executables. These off-line optimization techniques rely on instrumented binaries which collect profiling information off-line before optimization is performed. The profiling information may then be used to guide optimization decisions in the compiler or optimizer. Examples of off-line optimization include compiler-driven PDF (Profile-Directed Feedback, which is a term used by the IBM XL compilers) and FDPR (Feedback-Directed Program Re-ordering). However, off-line optimization techniques are severely limited because they must use previously collected profiling information to predict how to optimize for future workloads which may be significantly different from the past workloads used to generate the profiles.

Existing on-line binary optimization techniques commonly used today are limited to a dynamic process which uses a restricted set of interpreters or languages. Dynamic optimization provides the ability to observe and modify instructions of the executing program immediately before the instructions run. One example of on-line optimization in wide use today is a Just-In-Time (JIT) compiler for an interpreted language, such as Java® or PHP, which is a widely-used general-purpose scripting language suited for Web development and can be embedded into HTML. However, existing on-line optimizers rely on the fact that the language is interpreted (or the language that is executing is otherwise somehow externally controlled) before optimization occurs. Current research projects which focus on more general on-line binary optimization, including projects such as Dynamo, use very specific optimization techniques which rely on program interpretation, require changes to be made at load/execute time, and have difficulties dealing with synchronous exceptions/signals. None of the current on-line optimization techniques allow optimization of arbitrary already running processes.

SUMMARY OF THE INVENTION

The illustrative embodiments provide a generalized on-line solution to achieve transparent binary optimization using pre-existing profiling facilities and virtual memory remapping of text regions. An optimization environment is initialized which comprises a debugger program, a profiling facility, and an optimizer. A running target program is attached to the debugger program, wherein the debugger program monitors process execution of the target program. Responsive to monitoring the running target program, profile data of the running target program is collected using the profiling facility. The profile data is provided to the optimizer, wherein the optimizer analyzes the profile data and existing code of the running target program. Responsive to a determination to optimize the existing code based on the profile data, optimized code is generated for the running target program. The optimized code is provided to the debugger program, wherein the debugger program inserts the optimized code into a virtual address space of the running target program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
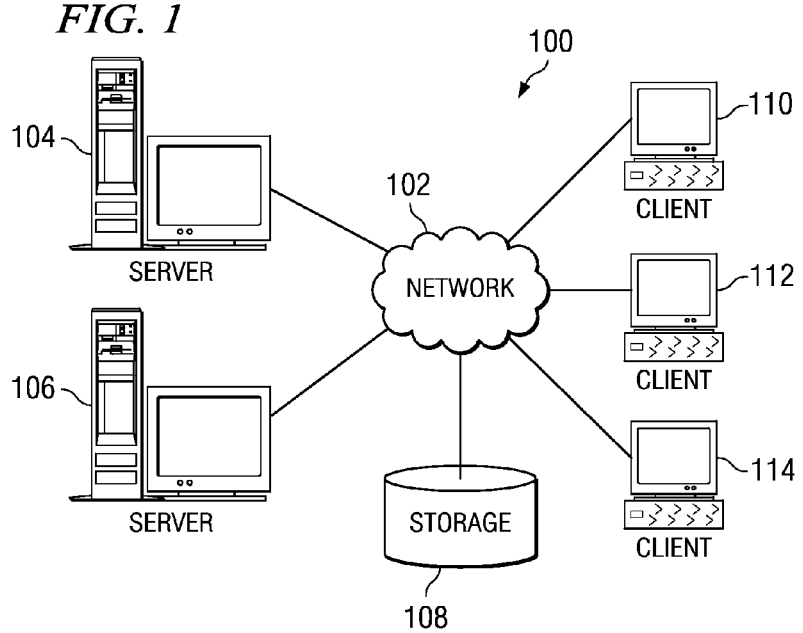
FIG. 1 depicts a pictorial representation of a distributed data processing system in which the illustrative embodiments may be implemented.
Figure 2:
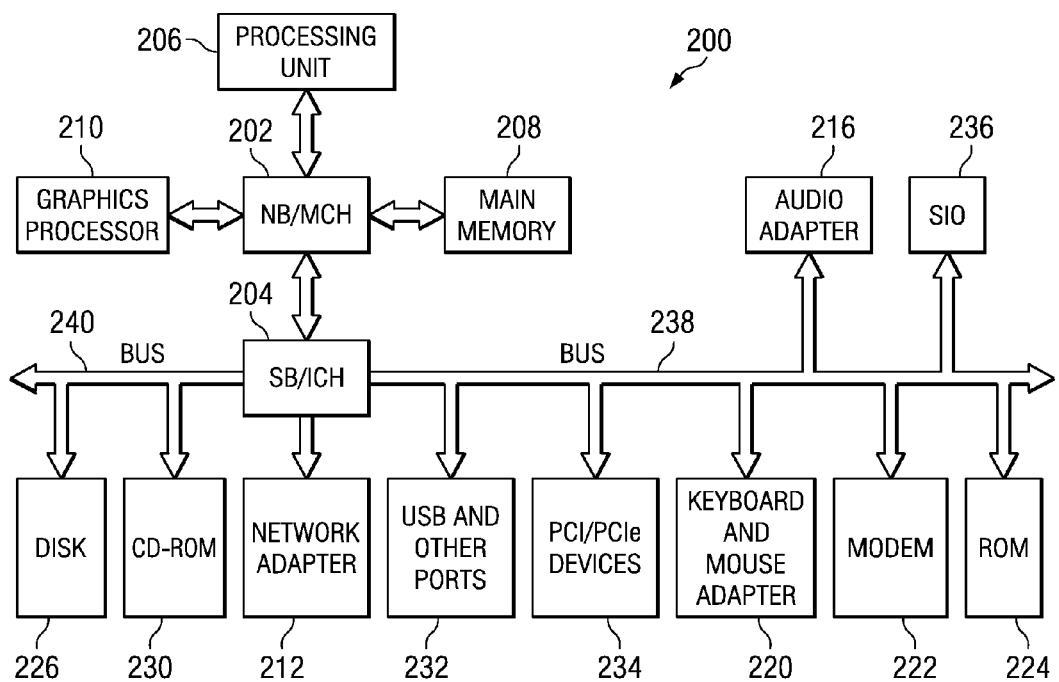
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a data processing system which is capable of transparently improving the performance of a native instruction stream as it executes on the processor. The illustrative embodiments offer a significant improvement over existing optimization techniques by providing a generalized on-line solution which leverages current real time profiling, operating system services, and a variety of optimization techniques. In particular, the illustrative embodiments use pre-existing profiling facilities and virtual-memory remapping of text regions to achieve transparent on-line binary optimization. The generalized on-line optimization technique is not tied to any particular interpreter or language, and it may be attached to any already running processes. Advantages of implementing the generalized on-line optimization technique in the illustrative embodiments include allowing optimization of any program without modifying binary images, as well as having the optimizations tuned to a running program's current behavior as opposed to off-line (permanent) tuning based on a single execution profile, which may not be correct for different input-sets and/or execution conditions. The generalized on-line solution in the illustrative embodiments requires access to operating system resources including a debugging environment, a per-process profiling facility, an optimizer, virtual memory mapping and unmapping of program text regions, and access to a per-process signal (fault) handler.

In particular, the optimization system in the illustrative embodiments may be implemented by starting a target program in an environment similar to a debugger environment. The debugger environment runs a separate thread(s) which attach to a running process in the target program and monitors process execution using an operating-system provided profiling facility which returns execution profile data. This execution profile data is fed into an optimizer which generates new binary versions of the running code. The optimizer may employ any known optimization techniques. For example, if the optimizer identifies a few "hot" functions that are frequently executed together, the optimizer may group these functions together onto a single page or set of pages to avoid unnecessary Translation Lookaside Buffer (TLB) or Effective to Real Address Translation (ERAT) misses. Alternatively, there are many common compiler optimizations which may be applied such as function inlining, loop-unrolling, load hoisting, and the like. Almost any known program optimization technique may be applied in the illustrative embodiments, and the detailed execution information provided by the operating system through performance counters or other profiling tools may be effectively leveraged at run time to tune for different workload variants or even different system conditions. When the optimizer generates new (optimized) code, the optimizer sends the new code back to the debugging environment. The new code is then injected into the virtual address space of the monitored process in the target program, thereby replacing the original code.

To facilitate installation of the optimized functions in the debugging environment, the illustrative embodiments also provide techniques for the unmapping and remapping of virtual pages. These techniques are used to perform on-line text optimization and replacement without changing the program that is running. These techniques of unmapping text and catching exceptions may be used iteratively to gradually migrate a program to an entirely new, optimized binary. A signal-handler may also be used to perform fix-ups for stale references to old functions or to ensure correct program behavior in the case of shared pages. A function is a contiguous block of code with a single entry point. In cases where an optimized function contains internal branches, it is assumed that the optimizer will provide relative references or position-independent-code, which may be placed at any address and still function correctly. If the relative references are not available, then any absolute addresses are changed to reflect the new code locations before the optimized function is inserted.

Figure 3:
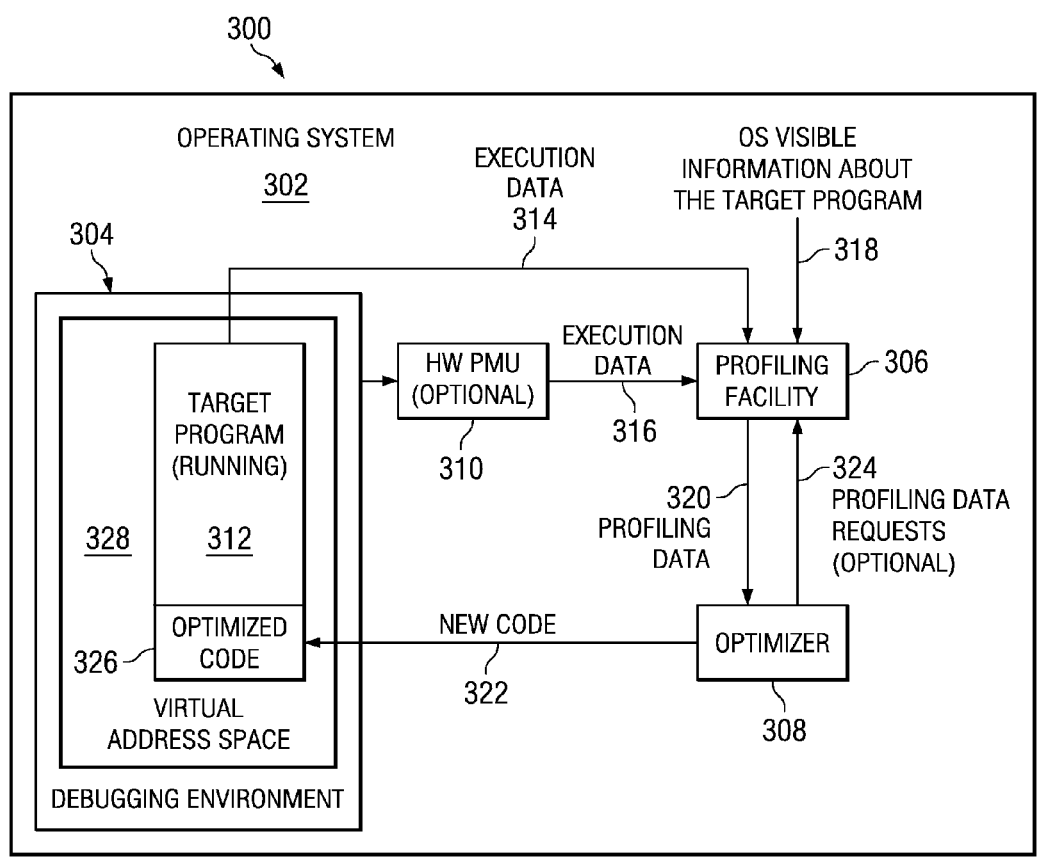
FIG. 3 is a block diagram of exemplary components in which the illustrative embodiments may be implemented.

Turning now to FIG. 3, a block diagram of exemplary components in which the illustrative embodiments may be implemented is shown. The components comprising the transparent on-line dynamic binary optimization system in FIG. 3 may be implemented in a data processing system such as server 104 or 106, or clients 110-114 in FIG. 1. In this illustrative example, on-line dynamic binary optimization system 300 comprises operating system 302, debugging environment 304, profiling facility 306, and optimizer 308. As modern profiling tools often make use of hardware performance monitoring facilities (commonly through interaction with the operating system), hardware performance monitoring unit (HW PMU) 310 may be provided as an optional component within on-line dynamic binary optimization system 300.

Debugging environment 304 is provided by operating system 302 and comprises facilities normally used by debuggers or development tools. In particular, debugging environment 304 comprises target program 312, optimized code 326, and virtual address space 328. As target program 312 is run in debugging environment 304, a debugger runs a separate thread (or threads) which attach to a running process in target program 312. Process execution data 314 is provided to profiling facility 306, which in turn generates execution profile data. The memory of running target program 312 may be modified by the optimizer and system calls may be made on behalf of target program 312. These system calls are used to perform the unmapping and remapping of virtual pages in the memory regions to facilitate installation of the optimized functions. Debugging environment 304 also receives signals from operating system 302. These signals are externally generated events which are generated by the hardware and passed by the operating system to processes in the debugging environment. Signals of interest include those which indicate that an invalid memory access has been made. Normally, a program is simply terminated if it receives one of these signals, but the signals may be intercepted and the program may be restarted in the debugging environment using the new code.

Profiling facility 306, like debugging environment 304, may be provided by operating system 302. Profiling facility 306 may run in a separate thread or process from target program 312. Profiling facility 306 obtains process execution data 314 about target program 312. For example, the data may be sent to profiling facility 306 by the debugging environment. Hardware PMU 310 may also collect process execution data 316 about target program 312, which is then provided to profiling facility 306. Operating system 302 may also provide visible information 318 about target program 312 to profiling facility 306. Thus, information about the target program may be provided to profiling facility in a variety of ways, depending upon the nature of the profiling mechanism. Based on the target program data provided, profiling facility 306 generates execution profile data about target program 312 and feeds the profile data 320 to optimizer 308.

Upon obtaining profiling data 320 from profiling facility 306, optimizer 308 generates new binary versions of the running code (new code 322) which are then inserted into the running target program through debugging environment 304. Optimizer 308 may run in a separate thread or process from target program 312. Optimizer 308 may leverage existing algorithms to generate new code 322. Optional data request 324 from optimizer 308 to profiling facility 306 may be provided as communication between optimizer 308 to profiling facility 306. For example, optimizer 308 may determine that more profiling data or a different type of profiling data is needed. As a result, optimizer 308 may send a request to profiling facility 306 specifying different or additional profiling data. New code 322 generated from optimizer 308 is inserted into the virtual address space of running target program 312 as optimized code 326. The techniques for inserting optimized code 326 into the address space are described in detail in FIGS. 5-8 below.

Figure 4:
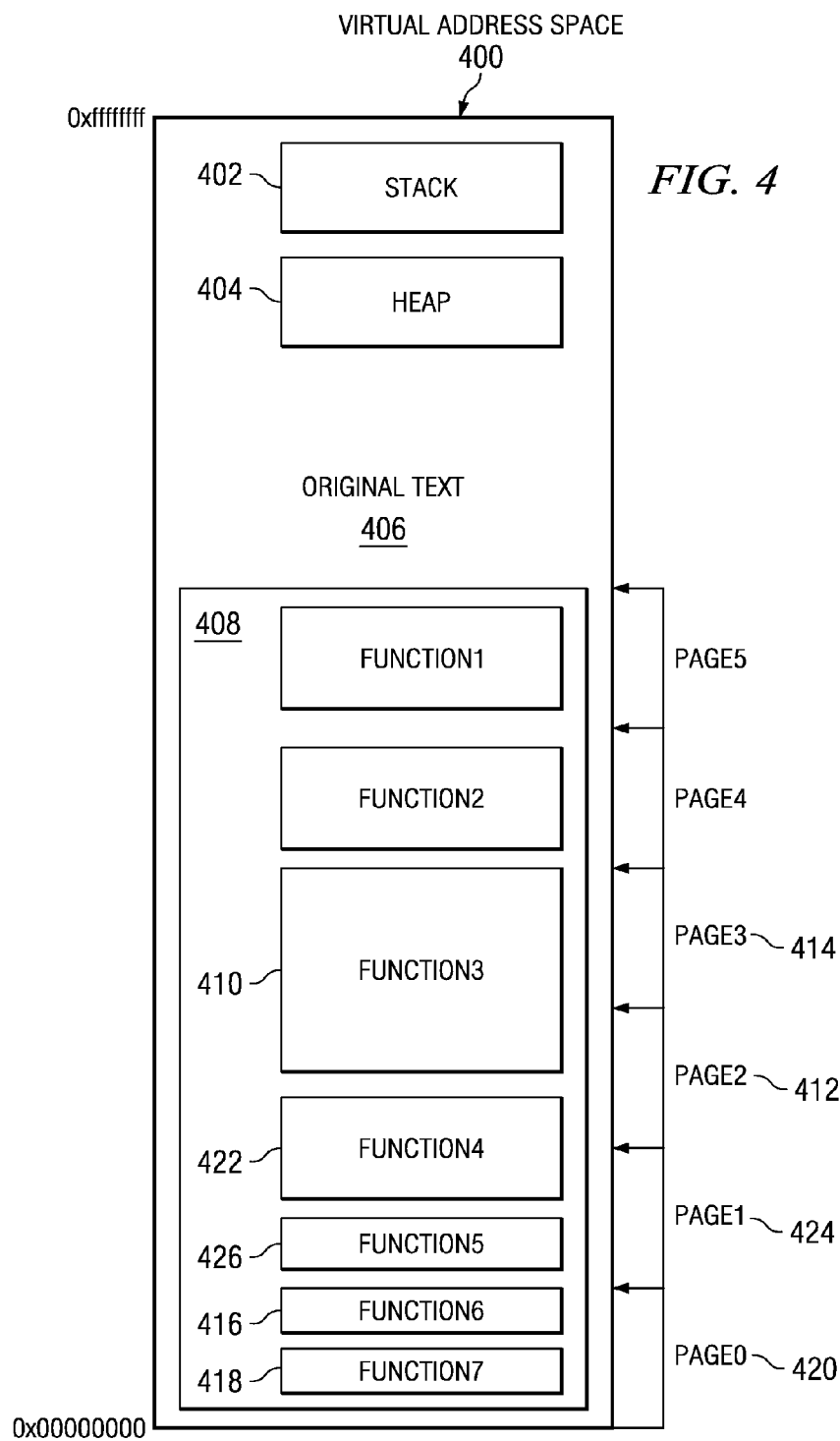
FIG. 4 illustrates an exemplary virtual address space comprising functions of differing sizes on pages of the same size in accordance with the illustrative embodiments.

In the illustrative embodiments, optimization occurs at a function level. As previously mentioned, the illustrative embodiments provide for the unmapping and remapping of virtual pages to facilitate installation of the optimized functions in the debugging environment. FIG. 4 illustrates an exemplary virtual address space of a process of the target component comprising functions of differing sizes on pages of the same size in accordance with the illustrative embodiments. Virtual address space 400 is an example of virtual address space 328 in FIG. 3 and is organized in pages which may be accessed by optimizer 308 in FIG. 3 for unmapping and remapping of virtual pages when installing the optimized functions.

In this illustrative example, virtual address space 400 of a running target program is shown to comprise stack 402, heap 404, original text 406, and code 408. Code 408 comprises various functions, where a function is a contiguous block of code with a single entry point. There may also be relative branches within a function or relative branches to other functions as well. Generally, functions are placed without any regard for page boundaries. As a result, there are many different layouts in which functions may be placed. For example, a large function (function3 410) may span multiple pages (page2 412 and page3 414), several small functions (function6 416 and function7 418) may be contained on a single page (page0 420), or a function (function4 422) may straddle two pages (page1 424 and page2 412) while sharing each page with other functions (function3 410 and function5 426). Optimized versions of the functions may also change in size without regard for their placement with respect to pages and other functions on those pages. Thus, the output of the optimizer may cause complications with regard to placement of the optimized functions in the virtual address space. Depending on the output of the optimizer, the different replacement scenarios are handled separately to ensure that program execution continues smoothly.

FIGS. 5-8 illustrate techniques used to perform on-line text optimization and replacement without changing the target program that is running. These techniques of unmapping text and catching exceptions may be used iteratively to gradually migrate a program to an entirely new, optimized binary. This binary may potentially be dumped later to create a new version of the program that is specifically tuned to a workload. These techniques may also be used on single-threaded or multi-threaded programs as long as the signal handler is the only entity able to see the exceptions and obtains the exceptions in a serial order. Any exceptions which are unrelated to the binary optimization may be passed on to the process's normal exception/signal handler directly.

Figure 5:
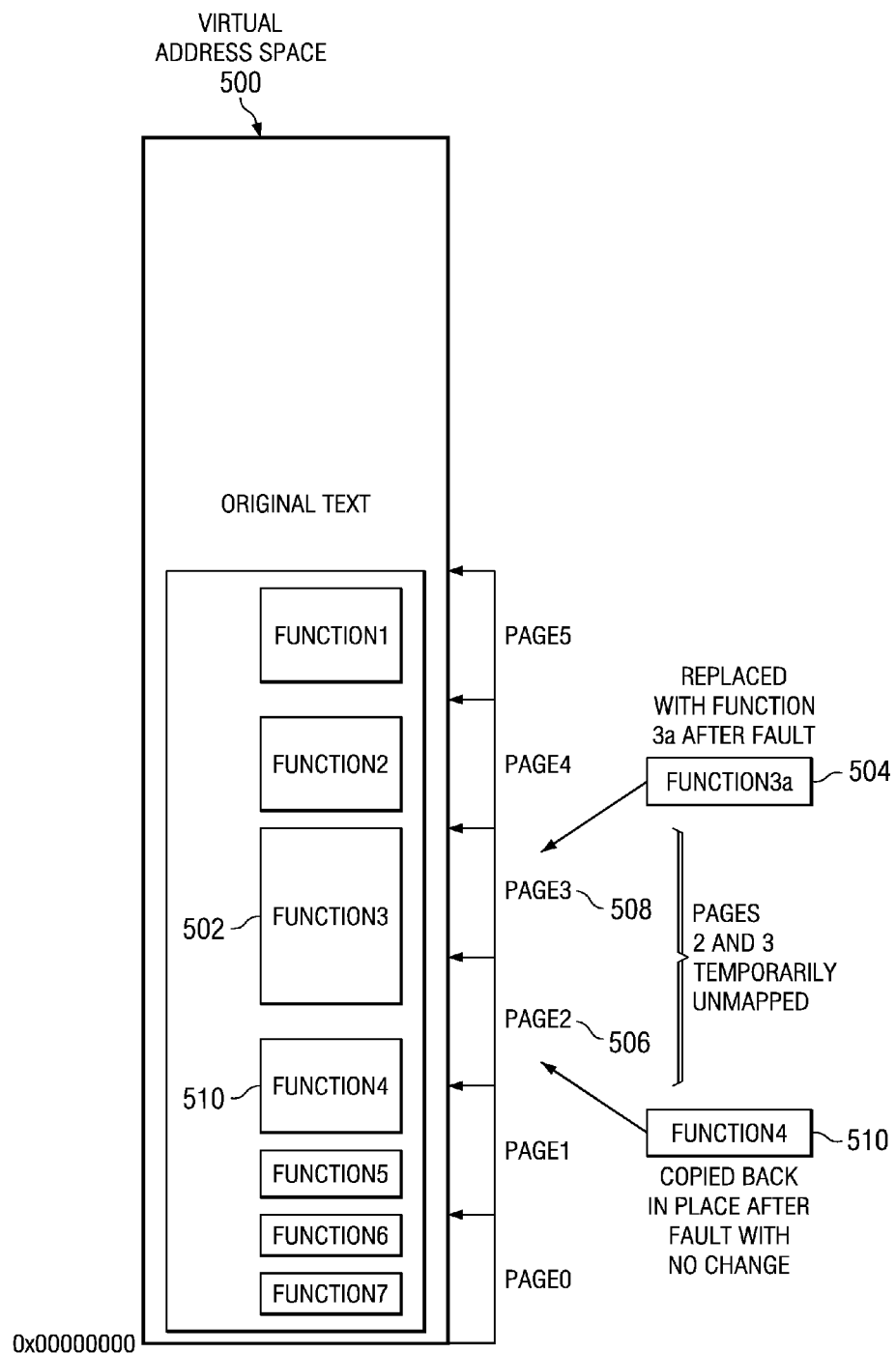
FIG. 5 illustrates an exemplary virtual address space prior to a function shrink on shared pages due to optimization in accordance with the illustrative embodiments.

FIG. 5 illustrates an exemplary virtual address space prior to a function shrink on shared pages due to optimization in accordance with the illustrative embodiments. Virtual address space 500 comprises various pre-existing or original functions which are mapped out prior to optimization, and the profile data is collected by the profiling facility on this basis. In this particular example, function3 502 is optimized to form function3a 504, the optimized code being smaller in size than the original. To insert the new code (function3a 504) into virtual address space 500, the page or pages which contain the original function (function3 502) are temporarily unmapped. As shown in this example, page2 506 and page3 508 are temporarily unmapped. Although function4 510 has not been optimized, function4 510 is also unmapped as it shares page2 506 with function3 502.

Figure 6:
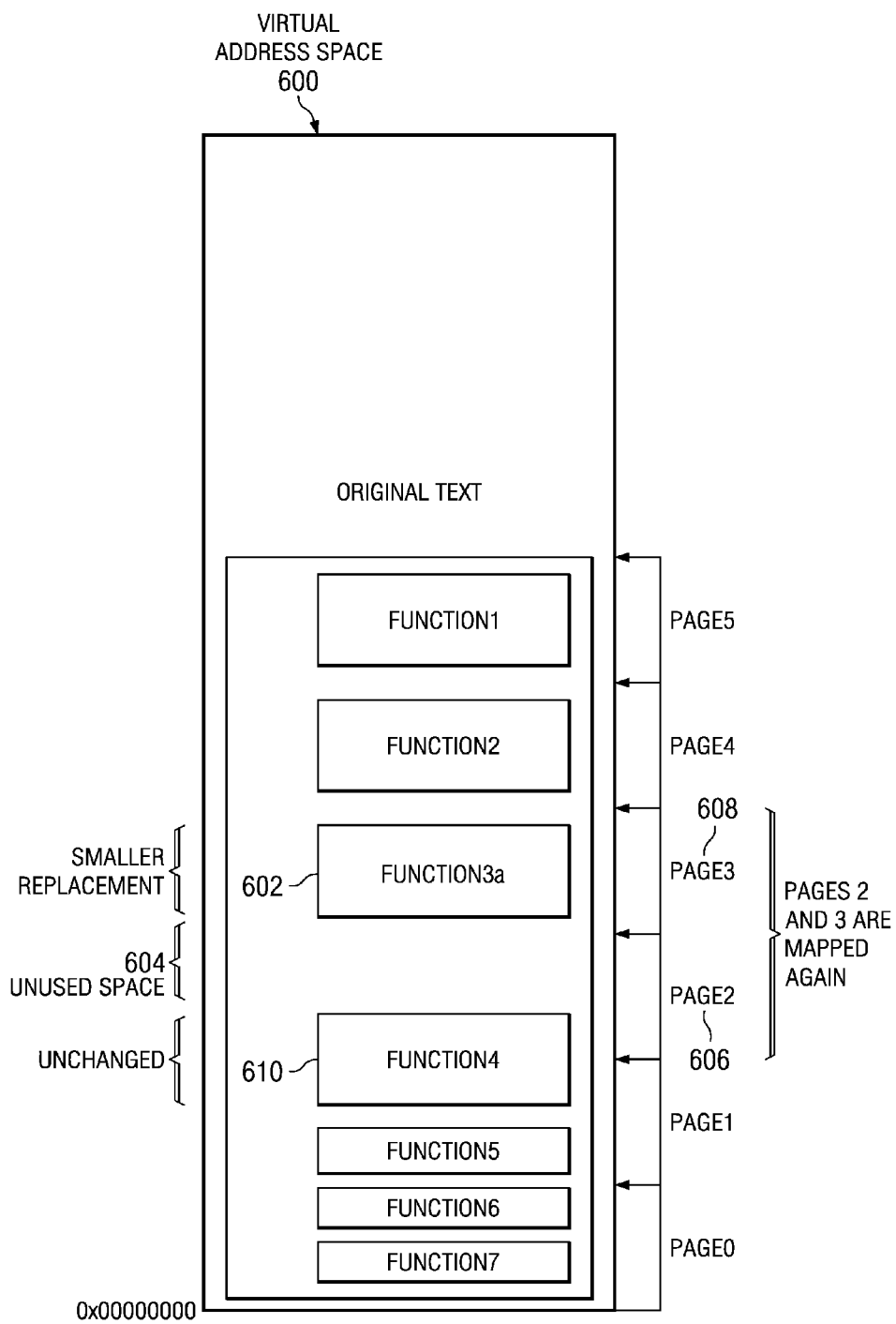
FIG. 6 illustrates an exemplary virtual address space after the optimized function is inserted on shared pages in accordance with the illustrative embodiments.

FIG. 6 illustrates an exemplary virtual address space after the optimized function is inserted on shared pages in accordance with the illustrative embodiments. As the size of the optimized function is smaller than the original function, the original function may be replaced in-line with the optimized function. Thus, after a page fault occurs on one of the unmapped pages (page2 506 or page3 508 in FIG. 5), the new version of the function (function3a 602) is installed at the same entry-point as the old function, which may result in unused space 604 if the new version of the function is smaller than the original function. The temporarily unmapped pages are then remapped (page2 606 and page3 608) to virtual address space 600. If the new function shares either page2 606 and page3 608 with other unrelated functions (function4 610), a page fault may result for one of these unchanged functions. In this case, the new version of the optimized function (function3a 602) is still installed, but unmodified functions or pieces of functions (function4 610) are also copied back into place unchanged so that execution may continue smoothly.

Figure 7:
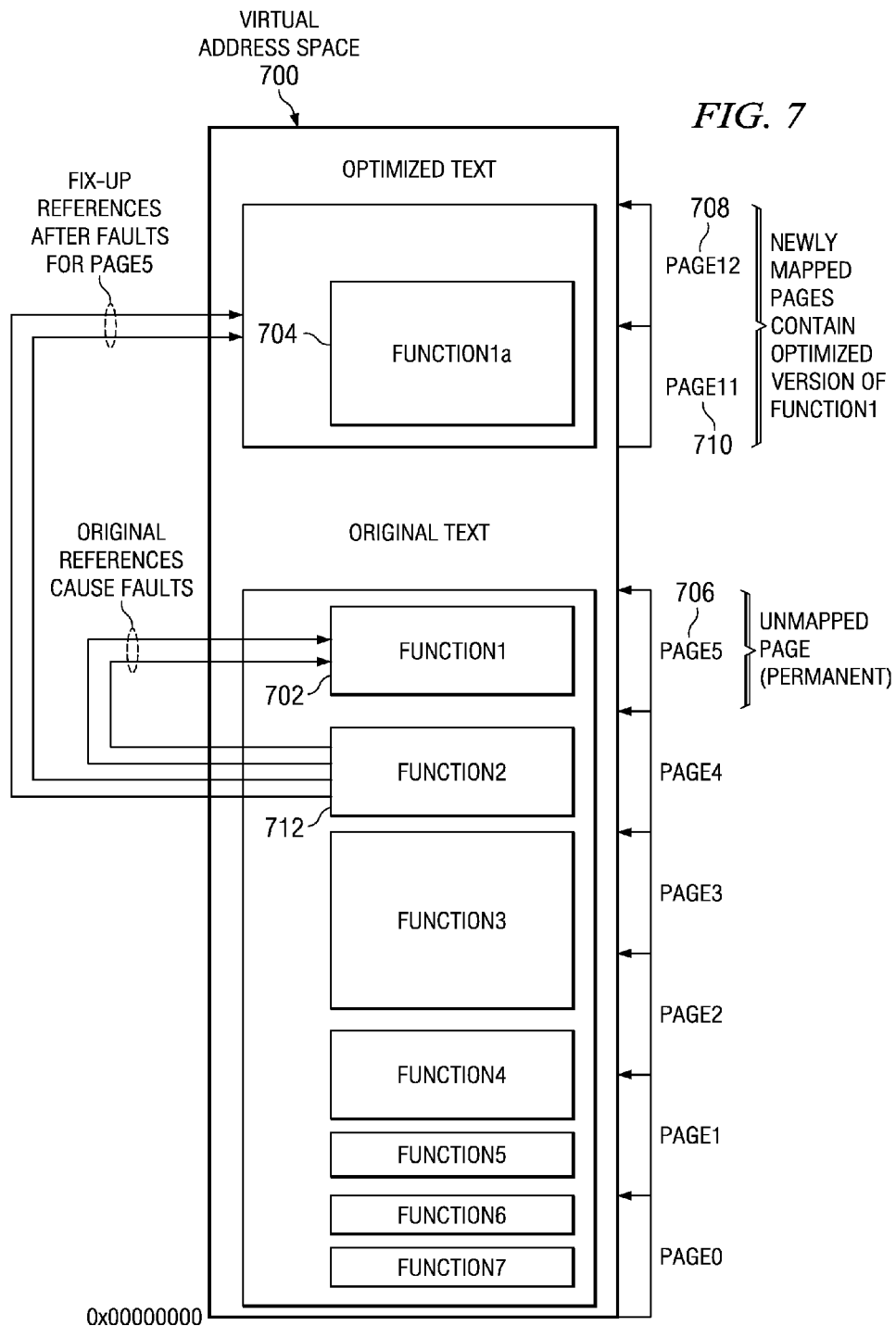
FIG. 7 illustrates an exemplary virtual address space after an optimized function expands beyond a page in accordance with the illustrative embodiments.

FIG. 7 illustrates an exemplary virtual address space after an optimized function expands beyond a page in accordance with the illustrative embodiments. When a function such as function1 702 is optimized, the new version of the function, function1a 704 may expand in size, such that optimized function1a 704 no longer fits within the space allotted to original function1 702. In this case, the optimized function is "moved" to a different location in virtual address space 700. For example, optimized function1 702 may be moved by permanently unmapping page5 706 where original function1 702 resides and mapping optimized function1a 704 elsewhere in the virtual address space, such as to page11 710 and page12 708. If another function such as function2 712 make a call to original function1 702, a page-fault is generated for the unmapped page5 706 and the operating system sends a signal to the target process. A signal-handler may be used to perform the fix-ups for stale references to old functions or to ensure correct program behavior in the case of shared pages. A signal handler which has been hooked (i.e., the debugging environment may intercept these signals and act on behalf of the target process) by the optimizer handles the signal by altering the stale reference to the address which called original function1 702 to point to optimized function1a 704 in the new location. In this manner, the target program may continue.

Figure 8:
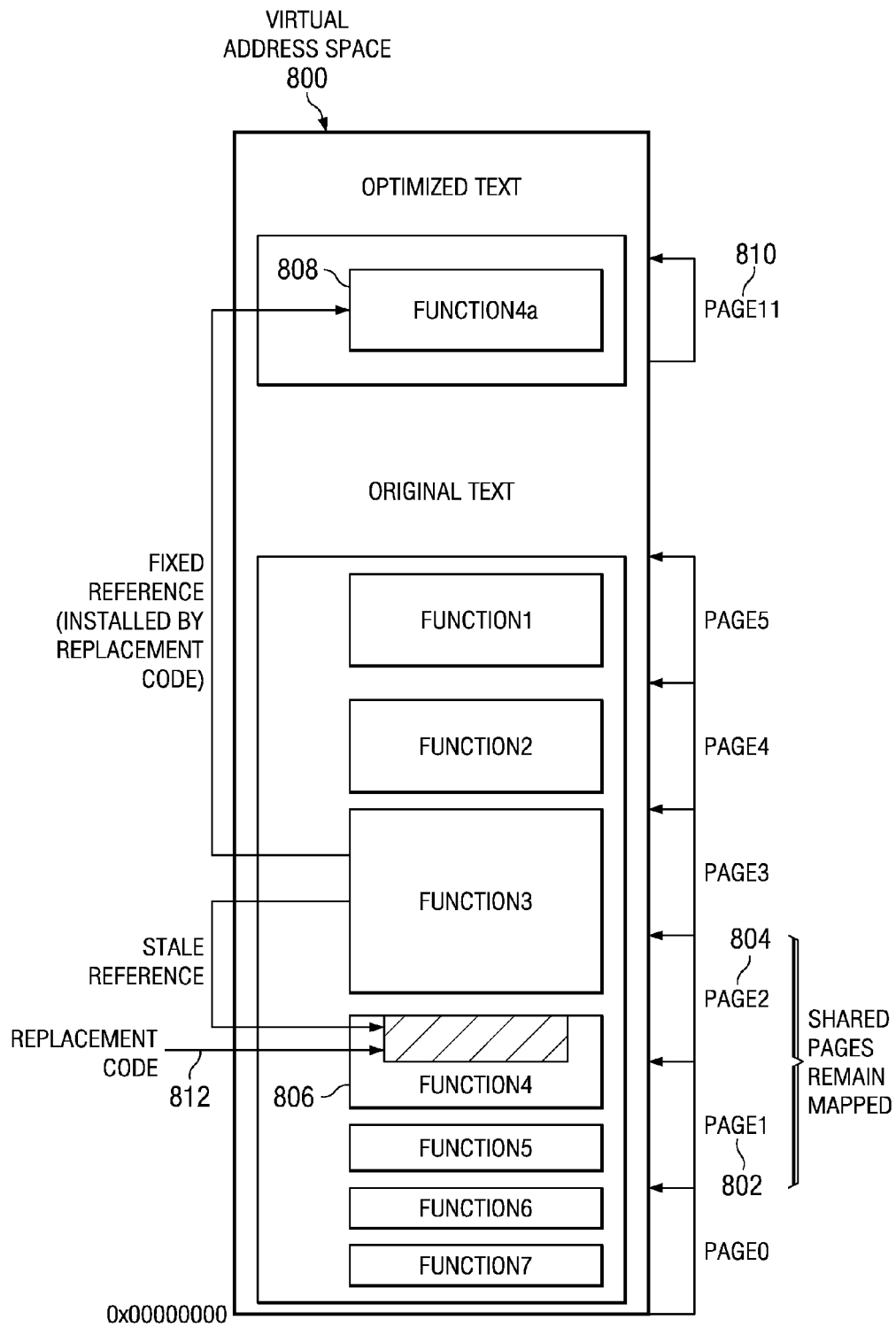
FIG. 8 illustrates an exemplary virtual address space after a function shrinks or expands on shared pages due to optimization in accordance with the illustrative embodiments.

FIG. 8 illustrates an exemplary virtual address space after a function shrinks or expands on shared pages due to optimization in accordance with the illustrative embodiments. This particular example illustrates how a function may shrink or expand after optimization in a page which is shared with other unrelated functions. In this case, page1 802 and page2 804 containing the entry-point to function4 806 is unmapped temporarily after a new copy of the optimized function4a 808 is placed elsewhere in virtual address space 800 (e.g., page11 810). At the location of the entry-point, a small amount code 812 is inserted which references the new version of the function (optimized function4a 808), and if possible, fixes the calling instruction to point to new location page11 810.

Figure 9:
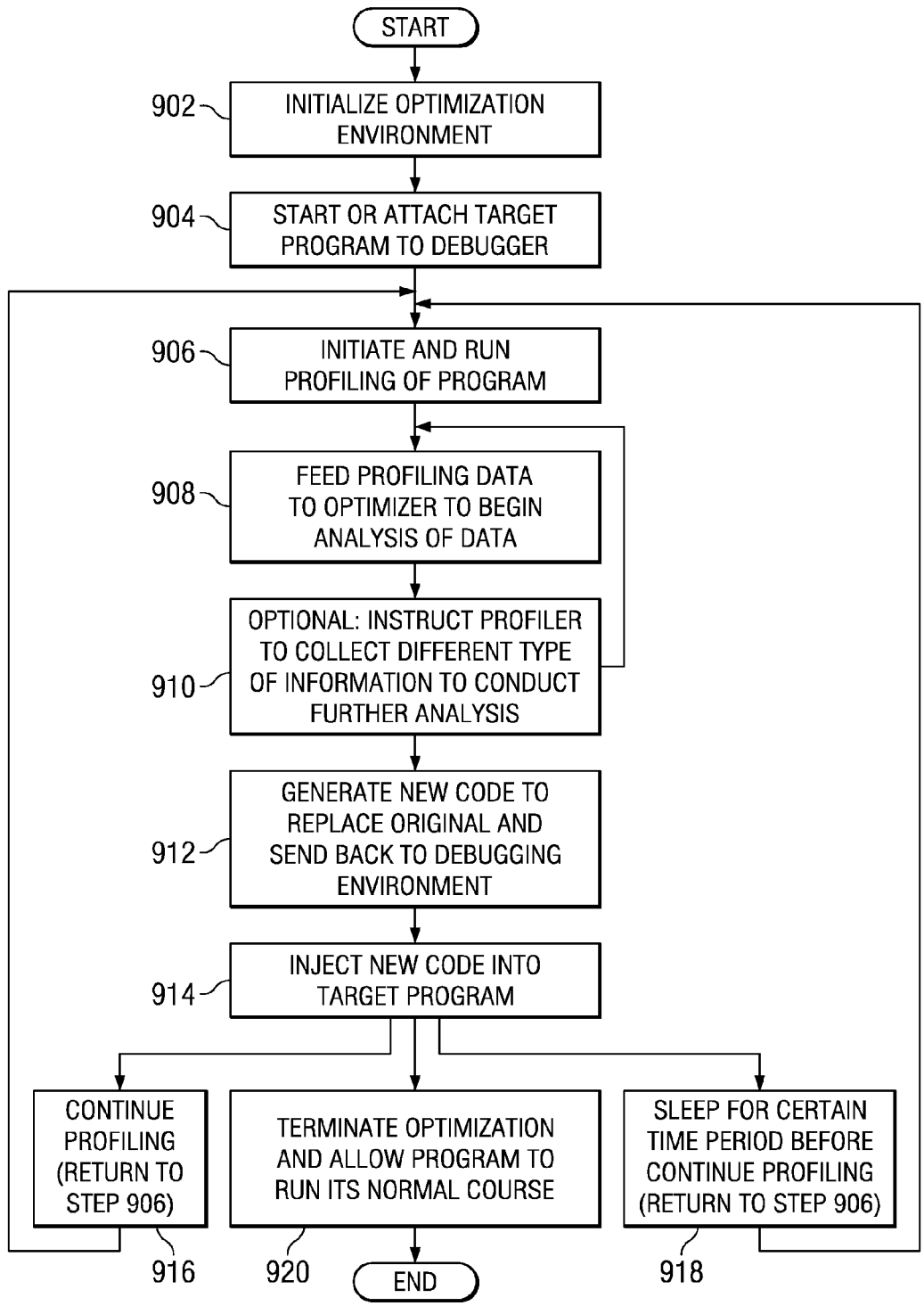
FIG. 9 is a flowchart of a process for providing transparent binary optimization using pre-existing profiling facilities and virtual memory remapping of text regions.

FIG. 9 is a flowchart of a process for providing transparent binary optimization using pre-existing profiling facilities and virtual memory re-mapping of text regions. The process begins when the optimization environment is initialized (step 902). The target program is then started and "attached" to a debugging program (step 904). The profiling facility is initiated which profiles the running target program (step 906). Depending upon the nature of the profiling performed, the profiling step may require that the target program run for a specific length of time.

Next, the profiling data obtained by the profiling facility is fed to the optimizer which begins an analysis of the data (step 908). This analysis is a continuation of the profiling performed in step 906. In an optional step, the optimizer may instruct the profiler to collect a different type of information to conduct further analysis of the target program (step 910), and the process returns to step 908 as this profile data is also fed to the optimizer.

The optimizer then generates new (optimized) code to replace the original code and sends the new code back to the debugging environment (step 912). When the debugging environment receives the new code, the new code is injected into the target program (step 914). At this point, the optimization process may perform one of three options. The process may immediately loop back to step 906 to continue the profiling of the target program (step 916), the process may first sleep for a period of time before looping back to step 906 to continue the profiling of the target program (step 918), or the optimization process terminates and the target program is allowed to run through its normal course of execution (step 920) with the process terminating thereafter.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for transparent binary optimization, the computer implemented method comprising:
   initializing an optimization environment comprising a debugger program, a profiling facility, and an optimizer;
   attaching a running target program to the debugger program, wherein the debugger program monitors process execution of the target program;
   responsive to monitoring the running target program, collecting profile data of the running target program using the profiling facility;
   providing the profile data to the optimizer, wherein the optimizer analyzes the profile data and existing code of the running target program;
   responsive to a determination to optimize the existing code based on the profile data, generating optimized code for the running target program; and
   providing the optimized code to the debugger program, wherein the debugger program inserts the optimized code into a virtual address space of the running target program, and wherein inserting the optimized code into the virtual address space of the running target program is in response to a comparison of a size of the optimized code to a size of the existing code of the running target program.

2. The computer implemented method of claim 1, further comprising:
   executing the running target program with the optimized code.

3. The computer implemented method of claim 1, wherein the existing code is optimized at a function level, and wherein a function is a contiguous block of code having a single entry point.

4. The computer implemented method of claim 3, wherein the profile data is collected based on pre-existing functions mapped in the virtual address space prior to optimization.

5. The computer implemented method of claim 1, wherein inserting the optimized code into a virtual address space of the running target program further comprises:
   responsive to determining that the optimized code is one of a same size or a smaller size than the existing code of the running target program, temporarily unmapping one or more pages occupied by the existing code;
   responsive to detecting a page fault on the one or more pages, inserting the optimized code at a same entry point in the virtual address space previous occupied by the existing function; and
   remapping the one or more pages to the optimized code.

6. The computer implemented method of claim 5, wherein functions sharing the one or more pages with the existing code are temporarily unmapped and remapped in an unaltered form.

7. The computer implemented method of claim 1, wherein inserting the optimized code into a virtual address space of the running target program further comprises:
   responsive to determining that the optimized code is a larger size than the existing code, permanently unmapping one or more pages occupied by the existing code;
   inserting the optimized code at a new location in the virtual address space; and
   responsive to a page fault being generated when a stale reference is used to call the existing code, changing the stale reference to point to the new location of the optimized code.

8. The computer implemented method of claim 7, wherein a signal handler detects the page fault and changes the stale reference to point to the new location of the optimized code.

9. The computer implemented method of claim 1, wherein inserting the optimized code into a virtual address space of the running target program further comprises:

responsive to detecting a page fault when a stale reference is used to call the existing code, temporarily unmapping a page containing an entry point to the existing code;

inserting the optimized code in a new location in the virtual address space;

inserting code into the entry point, wherein the code points to the new location of the optimized code; and changing the stale reference to point to the new location of the optimized code.

10. The computer implemented method of claim 1, wherein analyzing the profile data further includes instructing the profiling facility to collect and provide another type of profiling data to the optimizer.

11. The computer implemented method of claim 1, wherein the debugger program and the profiling facility run in separate threads from the running target program.

12. A data processing system for transparent binary optimization, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to initialize an optimization environment comprising a debugger program, a profiling facility, and an optimizer, attach a running target program to the debugger program, wherein the debugger program monitors process execution of the target program, collect profile data of the running target program using the profiling facility in response to monitoring the running target program, provide the profile data to the optimizer, wherein the optimizer analyzes the profile data and existing code of the running target program, generate optimized code for the running target program in response to a determination to optimize the existing code based on the profile data, and provide the optimized code to the debugger program, wherein the debugger program inserts the optimized code into a virtual address space of the running target program, and wherein inserting the optimized code into the virtual address space of the running target program is in response to a comparison of a size of the optimized code to a size of the existing code of the running target program.

13. A computer program product for transparent binary optimization, the computer program product comprising:

a computer readable storage medium having computer usable program code tangibly embodied thereon, the computer usable program code comprising:

computer usable program code for initializing an optimization environment comprising a debugger program, a profiling facility, and an optimizer;

computer usable program code for attaching a running target program to the debugger program, wherein the debugger program monitors process execution of the target program;

computer usable program code for collecting profile data of the running target program using the profiling facility in response to monitoring the running target program;

computer usable program code for providing the profile data to the optimizer, wherein the optimizer analyzes the profile data and existing code of the running target program;

computer usable program code for generating optimized code for the running target program in response to a determination to optimize the existing code based on the profile data; and computer usable program code for providing the optimized code to the debugger program, wherein the debugger program inserts the optimized code into a virtual address space of the running target program, and wherein inserting the optimized code into the virtual address space of the running target program is in response to a comparison of a size of the optimized code to a size of the existing code of the running target program.

14. The computer program product of claim 13, further comprising:

computer usable program code for executing the running target program with the optimized code.

15. The computer program product of claim 13, wherein the existing code is optimized at a function level, and wherein a function is a contiguous block of code having a single entry point.

16. The computer program product of claim 15, wherein the profile data is collected based on pre-existing functions mapped in the virtual address space prior to optimization.

17. The computer program product of claim 13, wherein the computer usable program code for inserting the optimized code into a virtual address space of the running target program further comprises:

computer usable program code for temporarily unmapping one or more pages occupied by the existing code in response to determining that the optimized code is one of a same size or a smaller size than the existing code of the running target program;

computer usable program code for inserting the optimized code at a same entry point in the virtual address space previous occupied by the existing function in response to detecting a page fault on the one or more pages; and computer usable program code for remapping the one or more pages to the optimized code.

18. The computer program product of claim 17, wherein functions sharing the one or more pages with the existing code are temporarily unmapped and remapped in an unaltered form.

19. The computer program product of claim 13, wherein the computer usable program code for inserting the optimized code into a virtual address space of the running target program further comprises:

computer usable program code for permanently unmapping one or more pages occupied by the existing code in response to determining that the optimized code is a larger size than the existing code;

computer usable program code for inserting the optimized code at a new location in the virtual address space; and computer usable program code for changing the stale reference to point to the new location of the optimized code in response to a page fault being generated when a stale reference is used to call the existing code.

20. The computer program product of claim 19, wherein a signal handler detects the page fault and changes the stale reference to point to the new location of the optimized code.

21. The computer program product of claim 13, wherein the computer usable program code for inserting the optimized code into a virtual address space of the running target program further comprises:

computer usable program code for temporarily unmapping a page containing an entry point to the existing code in response to detecting a page fault when a stale reference is used to call the existing code;

computer usable program code for inserting the optimized code in a new location in the virtual address space;

computer usable program code for inserting code into the entry point, wherein the code points to the new location of the optimized code; and computer usable program code for changing the stale reference to point to the new location of the optimized code.

22. The computer program product of claim 13, wherein analyzing the profile data further includes instructing the profiling facility to collect and provide another type of profiling data to the optimizer.

23. The computer program product of claim 13, wherein the debugger program and the profiling facility run in separate threads from the running target program.

24. A computer implemented method for transparent binary optimization, the computer implemented method comprising:

initializing an optimization environment comprising a debugger program, a profiling facility, and an optimizer;

attaching a running target program to the debugger program, wherein the debugger program monitors process execution of the target program;

responsive to monitoring the running target program, collecting profile data of the running target program using the profiling facility;

providing the profile data to the optimizer, wherein the optimizer analyzes the profile data and existing code of the running target program;

responsive to a determination to optimize the existing code based on the profile data, generating optimized code for the running target program; and providing the optimized code to the debugger program, wherein the debugger program inserts the optimized code into a virtual address space of the running target program, wherein inserting the optimized code into a virtual address space of the running target program further comprises a plurality of steps selected from a group comprising one of:

a) responsive to determining that the optimized code is one of a same size or a smaller size than the existing code of the running target program, temporarily unmapping one or more pages occupied by the existing code; responsive to detecting a page fault on the one or more pages, inserting the optimized code at a same entry point in the virtual address space previous occupied by the existing function; and remapping the one or more pages to the optimized code;

b) responsive to determining that the optimized code is a larger size than the existing code, permanently unmapping one or more pages occupied by the existing code; inserting the optimized code at a new location in the virtual address space; and responsive to a page fault being generated when a stale reference is used to call the existing code, changing the stale reference to point to the new location of the optimized code; and c) responsive to detecting a page fault when a stale reference is used to call the existing code, temporarily unmapping a page containing an entry point to the existing code; inserting the optimized code in a new location in the virtual address space; inserting code into the entry point, wherein the code points to the new location of the optimized code; and changing the stale reference to point to the new location of the optimized code.

\* \* \* \* \*